United States Patent [19]

Vyvial

[11] 4,055,325

[45] Oct. 25, 1977

[54] LUBRICANT POCKET FOR PRESSED IN GATE VALVE SEAT

[75] Inventor: Larry A. Vyvial, Richmond, Tex.

[73] Assignee: ACF Industries, Incorporated, New York, N.Y.

[21] Appl. No.: 732,239

[22] Filed: Oct. 14, 1976

[51] Int. Cl.² .......................... F16K 3/30; B23P 17/00
[52] U.S. Cl. ...................................... 251/328; 29/424; 29/458; 29/525
[58] Field of Search ................. 29/424, 451, 525, 458; 251/328

[56] References Cited

U.S. PATENT DOCUMENTS 3,078,754  2/1963  DeLacy ................................ 29/525
3,186,713  6/1965  Hebble ............................... 29/451 X

*Primary Examiner*—Arnold Rosenthal
*Attorney, Agent, or Firm*—Eugene N. Riddle

[57] ABSTRACT

A generally cylindrical seat for a gate valve is pressed in a recess in the valve body with a tight fit. A deformable seal fits within an opposed pair of grooves on the back face of the seat and the gate valve body and the seal is deformed when the seat is pressed in the recess. The seat has a relatively small annular channel spaced in outer concentric relation to the seal groove to provide a lubricant pocket to receive lubricant forced along the adjacent contacting surfaces defining the recess when the seat is pressed in and permit metal-to-metal abutting contact between the seat and valve body.

5 Claims, 5 Drawing Figures

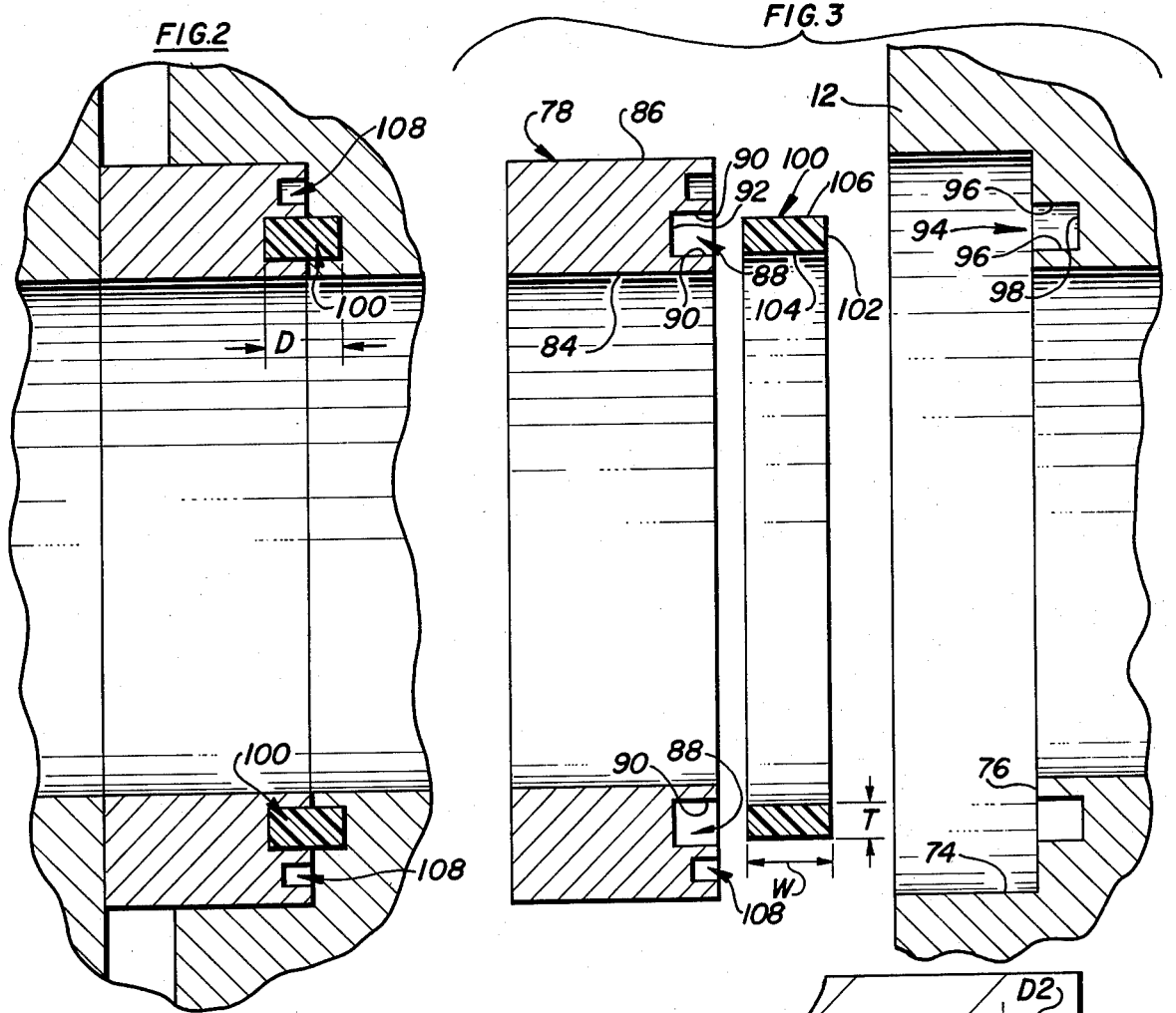
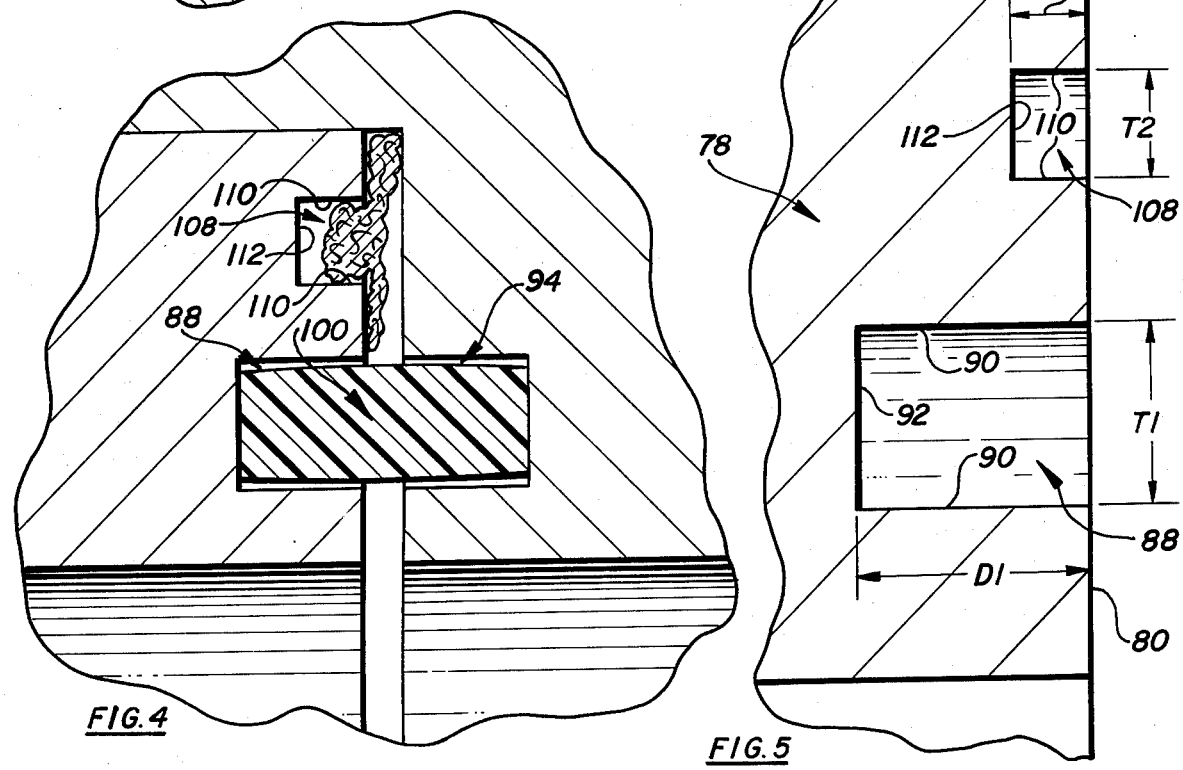

LUBRICANT POCKET FOR PRESSED IN GATE VALVE SEAT

BACKGROUND OF THE INVENTION

U.S. Pat. No. 3,929,316 dated Dec. 30, 1975 is directed to a non-floating pressed in seat for a gate valve. An annular deformable seal, preferably formed of Teflon, is positioned in opposed grooves in the back face of the seat and the adjacent body surface defining the body recess in which the seat is pressed. The seal and groove are sized in order to provide a face-to-face abutting contact between the seat and the body without any portion of the seal being gripped between the opposed faces of the seat and valve body. The pressed-in seat provides a fluid-tight barrier to fluid pressure tending to seep outwardly past the seal. Thus, the area of the seat exposed to fluid pressure is minimized and a non-floating seat is provided.

In order to easily press the seat in the body recess without any galling of contacting surfaces a lubricant is normally placed on the outer peripheral surface of the seat and/or the inner peripheral contacting surface of the recess. The insertion of the seat with tight tolerances sometimes results, particularly when a relatively large amount of lubricant is positioned on the adjacent peripheral surfaces, in the forcing of the lubricant along the inner peripheral surface of the recess and along a portion of the back face of the seat adjacent the inner peripheral surface defining the recess which sometimes prevents full metal-to-metal abutting contact with the valve body. If the seal is not fully seated, fluid pressure behind the seat may urge the seal outwardly out of its recess.

DESCRIPTION OF THE INVENTION

This invention is directed to the addition of an excess lubricant catching pocket to the back face of the seat. The lubricant pocket is formed in the back face of the seat by an annular channel in outer concentric relation to the adjacent annular groove receiving the seat. Any lubricant forced along the adjacent peripheral surfaces of the seat and recess between the back face of the seal and the adjacent opposed body surface of the recess is blocked by the seal and forced within the lubricant pocket. By permitting any excess lubricant to be received within the lubricant pocket, a full seating of the seat in metal-to-metal abutting contact into the valve body is provided and a fluid-tight barrier to fluid pressure tending to seep outwardly of the seal is maintained.

BRIEF DESCRIPTION OF THE DRAWINGS

In the accompanying drawings, in which one of various possible embodiments of the invention is illustrated.

FIG. 2 is an enlarged fragment of FIG. 1 showing a seat in position with a seal positioned within opposed aligned grooves of the seat and adjacent body portion, and an annular channel adjacent the seal to receive lubricant therein;

FIG. 3 is an exploded view of the structure shown in FIG. 2 with the seat and seal shown prior to assembly in the body portion;

FIG. 4 is a fragmentary sectional view showing the seat and seal in an intermediate position prior to the seat being pressed into metal-to-metal contact with the recessed body portion; and FIG. 5 is an enlarged fragment of the seat ring showing the annular channel forming a lubricant pocket in outer concentric relation to the annular groove for the seal.

Figure 1:
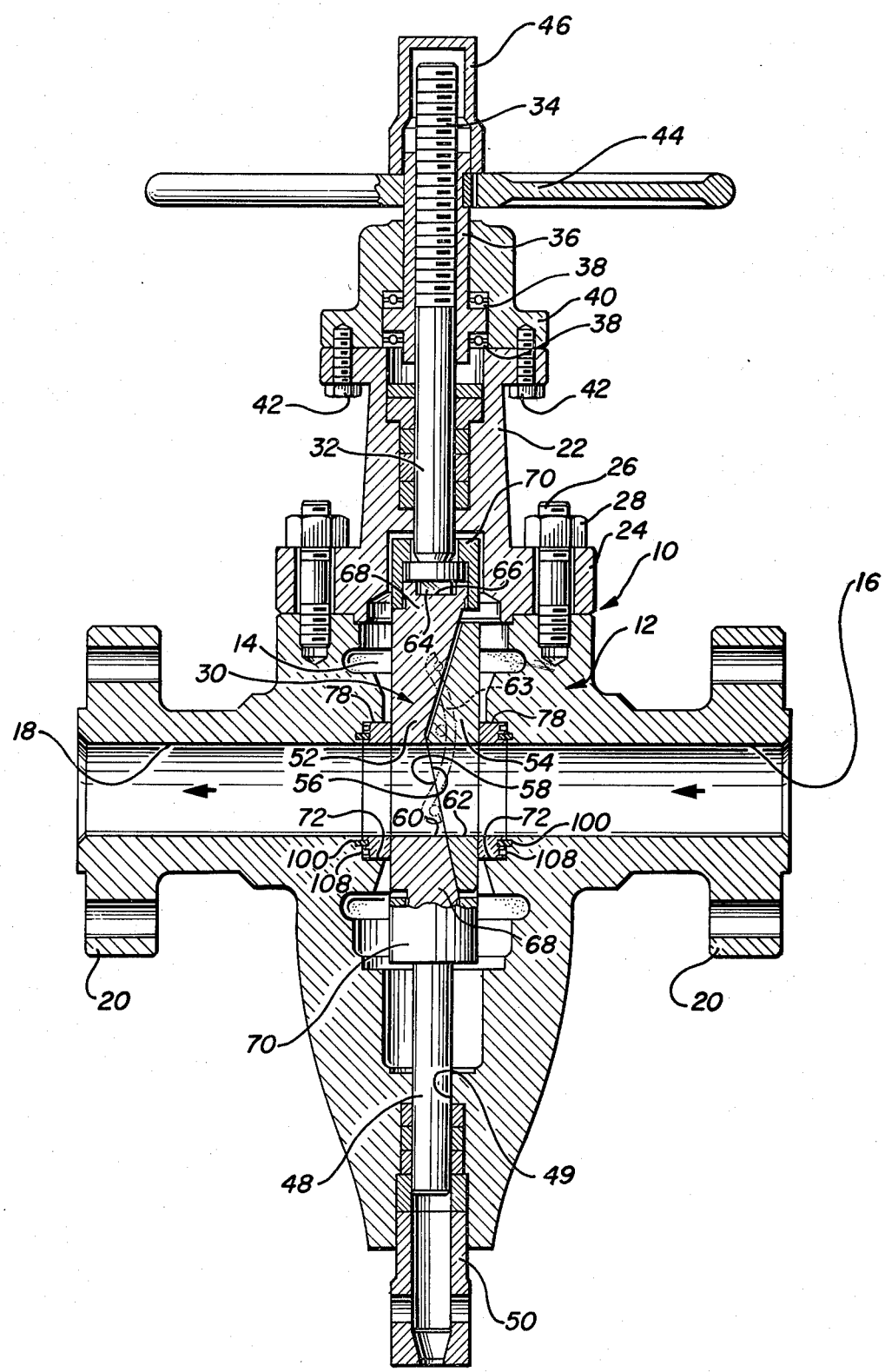
FIG. 1 is a section of a hydraulically balanced gate valve structure having an expanding gate assembly embodying the present invention.

Referring now to the drawings for a better understanding of the invention, a gate valve structure generally indicated 10 includes a valve body generally designated 12 having a valve chamber 14 therein. An inlet flow passage 16 and an outlet flow passage 18 communicate with valve chamber 14. Flanges 20 on the ends of valve body 12 may be suitably connected to a pipeline or other flow system as is well known in the art. A bonnet 22 has a lower flange 24 which is secured by studs 26 and nuts 28 to the upper end of body 12.

The gate valve assembly generally indicated 30 is mounted within chamber 14 for movement between open and closed positions relative to flow passages 16 and 18. An upper operating valve stem 32 has an upper threaded portion 34. Internally threaded drive sleeve 36 is supported for rotary movement relative to bonnet 22 by thrust bearings 38 mounted within a bearing housing 40. Bearing housing 40 is secured by studs 42 to the upper end of bonnet 22. A handwheel 44 is disposed at the upper end of drive sleeve 36 and is retained thereon by stem cover 46. It is understood that any one of a number of possible manual or power operated mechanisms may be provided to control the movement of operating stem 32. Mounted adjacent the lower end of gate assembly 30 is a pilot or balancing stem 48 in body 12 which communicates with chamber 14 and a lower sleeve 50 is telescoped within opening 49. Stems 32 and 48 are substantially the same cross-sectional areas so that the areas of gate assembly 30 exposed to fluid pressure adjacent stems 32 and 48 are equal. Fluid pressure in chamber 14 above and below gate assembly 30 are therefore equalized and gate assembly 30 is hydraulically balanced.

Gate assembly 30 includes a gate element 52 and a complementary segment 54. Gate element 52 has a concave V-shaped back face 56 and segment 54 has a complementary convex V-shaped back face 58 to fit V-shaped face 56 and upon longitudinal movement between gate element 52 and segment 54 to expand gate assembly 30 outwardly. Suitable ports 60 and 62 are provided in gate element 52 and segment 54 to align with flow passages 16 and 18 in ann open position of gate assembly 30. A spring 63 continuously urges gate element 30 and segment 54 toward a collapsed or retracted position.

Operating stem 32 and pilot stem 48 are connected to gate assembly 30 in identical fashion. Each stem 32 and 48 has an elongate key 64 which is received within an elongated slot 66 on an externally threaded extension 68 provided adjacent each end of gate element 52. Connector nuts 70 connect operating stem 32 and pilot stem 48 to threaded extensions 68 on opposite ends of gate element 52.

Flow passages 16 and 18 adjacent chamber 14 have annular recesses generally designated 72 defined by outer radial surfaces 74 and annular surfaces or ledges 76 extending in a direction generally perpendicular to radial surfaces 74. A seat ring generally designated 78 has a back face surface 80 and a front face surface 82 with an inner circumference 84 and an outer circumference 86. Back face surface 80 has an annular groove generally designated 88 therein defined by a pair of opposed side walls 90 and an end wall 92. Annular surface 76 has a facing annular groove 94 defined by side walls 96 and end wall 98.

A seal generally designated 100, preferably formed of nylon or tetrafluoroethylene sold under trademark "Teflon" has a generally rectangular cross-section to provide opposed end surfaces 102 and circumferential inner and outer surfaces 104 and 106 respectively. Annular grooves 88 and 94 face each other and are of substantially the same thickness T1 and depth D1. Seal 100 has a width W which is greater than the combined depths D of grooves 88 and 94. The thickness T of seal 100 is less than the thickness T1 of grooves 88 and 94 and satisfactory results have been obtained with thickness T being between around 70 and 90% of thickness T1 of grooves 88 and 94. Seal 100 preferably is of a width W sufficient to provide a compression of seal 100 while permitting a metal-to-metal contact for seats 78 against ledges 76 without any portion of seal 100 flowing between surfaces 76 and 80 and thereby being pinched. Thickness T of seal 100 is sufficient to permit such compression without buckling. Effective results have been obtained with width W being between around 105 and 130% of the total combined depth D of grooves 88 and 94.

When seats 78 are pressed within recesses 72, seals 100 are compressed and a metal-to-metal contact is provided between surfaces 76 and 80 with seals 100 not flowing or being pinched between surfaces 76 and 80, and substantially filling the volume of grooves 88 and 94. For satisfactory results and employing a Teflon seal, it has been found that seal 100 should fill at least ground 80% of the total cross-sectional area of combined grooves 88 and 94 and 100% would be optimum. However, it is very difficult to obtain 100% without a portion of the seal flowing between surfaces 76 and 80. Therefore, taking into consideration manufacturing tolerances and the total circumference of the seal, highly effective results have been obtained with 95% of the total cross-sectional area of grooves 88 and 94 being filled with seal 100.

Normally, in order to minimize any galling when seats 78 are pressed within recesses 72 and to permit seats 78 to be pressed in easily, a thin layer of a suitable lubricant is spread over outer peripheral surfaces 86 and adjacent radial surfaces 74 of each seat 78 before the seat is pressed within its associated recess 72. At least a portion of the lubricant, the amount depending on the total amount applied to surfaces 74 and 86, is pushed or forced inwardly onto ledge or annular surface 76 and back face 80. At times, a sufficient amount of lubricant is forced between ledge 76 and back face 80 to prevent a full metal-to-metal seating of seat 78 on the associated ledge 76. When this occurs, the seats may tend to float under certain conditions of high pressure service. To remove any excess lubricant which is forced or positioned between ledges 76 and back faces 80, an annular channel generally indicated at 108 is provided in back face 80 of each seat 78 in outer concentric relation to adjacent annular groove 88. Annular channel 108 forms an excess lubricant pocket and receives lubricant therein which is initially blocked by seal 100. Channel 108 is defined by a pair of parallel sides 110 and a connecting end wall 112.

As a specific but non-limiting example, with flow passages 16 and 18 of a diameter of 2½ inches and employing a balanced stem expanding gate valve design of a 20,000 PSI internal pressure, grooves 88 and 94 are of a thickness T1 of 3/16 inch and a depth D1 of 3/16 inch. Channel 108 has a thickness T2 of 3/16 inch and a depth D2 of 1/16 inch. Seal 100 is formed of "Teflon" of a generally rectangular cross-section having a thickness T of ⅛ inch and a width W of 7/16 inch. As shown clearly in FIG. 4, lubricant is easily received in the lubricant receiving groove formed by channel 108 and a full seating of the associated seat 78 utilizing seal 100 is provided. The specific dimensions of lubricant channel 108 would vary depending primarily on the size of seat 78.

What is claimed is:

1. A gate valve structure comprising a valve body having a valve chamber therein and inlet and outlet flow passages communicating with the valve chamber, an expanding valve assembly including a gate element and segment slidably mounted within the valve chamber for movement between open and closed positions of the gate valve structure with said gate element and segment expanding away from each other at the fully open position, said valve body having an annular recessed portion about each flow passage and a circumferential groove in each of the recessed portions facing the valve chamber, generally cylindrical seats about said flow passages for engaging said element and segment in the open and closed positions of the gate element and segment, each seat having a relatively large seal receiving circumferential groove in opposed relation to the groove in the adjacent flow passage and fitting within an associated recessed portion in face-to-face abutting contact with the associated recessed portion, and a deformable seal of an elongate cross section positioned within each pair of opposed grooves and filling between 80 and 100 percent of the total cross-sectional areas of the combined facing grooves when the seat is pressed within the associated recessed portion, said seal upon being inserted within the opposed pair of grooves being deformed when the seat is in abutting contact with the associated recessed portion to fill substantially the entire cross-sectional area of the combined grooves, each seat having a relatively small annular channel in outer concentric relation to said relatively large circumferential groove to provide a lubricant pocket for lubricant forced along the inner peripheral surface defining the associated recess when the seat is pressed within the recess thereby to remove the lubricant from the adjacent recess surfaces and permit face-to-face abutting metal-to-metal contact between the seat and valve body without the seat being spaced from the body by a layer of lubricant.

2. A gate valve structure as set forth in claim 1 wherein said annular channel is generally rectangular in cross-section and has a depth less than the depth of said seal receiving groove.

3. A gate valve structure comprising a valve body having a valve chamber therein and an upstream flow passage communicating with the valve chamber, a gate valve mounted within the valve chamber for movement between open and closed positions, said valve body having an annular recessed portion about the upstream flow passage and a circumferential groove in the recessed portion facing the valve chamber, a generally cylindrical seal about the upstream flow passage and fitting within the recessed portion in face-to-face abutting contact with the recessed portion, and a deformable seal of an elongate cross-section positioned within said groove and filling between 80 and 100% of the total cross-sectional area of the groove, said seal upon being inserted within the groove being deformed when the seat is fitted in face-to-face abutting contact within the recessed portion to fill substantially the entire cross-sectional area of the groove, said seat having a relatively small annular channel in outer concentric relation to said relatively large circumferential groove to provide a lubricant pocket for lubricant forced along the inner peripheral surface defining the associated recess when the seat is pressed within the recess thereby to remove the lubricant from the adjacent recess surfaces and permit face-to-face abutting metal-to-metal contact between the seat and valve body without the seat being spaced from the body by a layer of lubricant.

4. A gate valve as set forth in claim 3 wherein said groove is of a generally rectangular cross-section and said elongate seal is generally rectangular in cross-section.

5. A gate valve as set forth in claim 3 wherein said deformable seal is formed of tetrafluoroethylene.

* * * * *